United States Patent
Taunton

(10) Patent No.: US 7,921,263 B2
(45) Date of Patent: Apr. 5, 2011

(54) SYSTEM AND METHOD FOR PERFORMING MASKED STORE OPERATIONS IN A PROCESSOR

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 908 days.

(21) Appl. No.: 11/643,999

(22) Filed: Dec. 22, 2006

(65) Prior Publication Data

US 2008/0155210 A1 Jun. 26, 2008

(51) Int. Cl.
*G06F 12/00* (2006.01)

(52) U.S. Cl. ........................................................ 711/154

(58) Field of Classification Search .................... None
See application file for complete search history.

(56) References Cited

U.S. PATENT DOCUMENTS

| | | | | |
|---|---|---|---|---|
| 5,696,959 A | | 12/1997 | Guttag et al. | |
| 5,703,810 A | * | 12/1997 | Nagy | 365/189.05 |
| 5,867,444 A | * | 2/1999 | Le et al. | 365/230.06 |
| 6,122,189 A | * | 9/2000 | Batra | 365/120 |
| 6,681,288 B2 | * | 1/2004 | Ware et al. | 711/105 |
| 6,820,195 B1 | | 11/2004 | Shepherd | |
| 6,826,663 B2 | * | 11/2004 | Perego et al. | 711/156 |
| 7,171,528 B2 | * | 1/2007 | Evans et al. | 711/156 |
| 7,529,907 B2 | * | 5/2009 | Nemirovsky et al. | 712/5 |
| 7,610,466 B2 | * | 10/2009 | Moyer | 711/170 |
| 2003/0056064 A1 | | 3/2003 | Gschwind | |

FOREIGN PATENT DOCUMENTS

| | | |
|---|---|---|
| EP | 19 39 727 A2 | 7/2008 |
| WO | WO 01/53934 A | 7/2001 |

OTHER PUBLICATIONS

European Search Report issued in EP 19 39 727 A2, on Sep. 24, 2008.

* cited by examiner

*Primary Examiner* — Hiep T Nguyen

(74) *Attorney, Agent, or Firm* — Sterne, Kessler, Goldstein & Fox PLLC

(57) ABSTRACT

A system and method for accelerated handling of masked store operations in a processor or processor-based system/chip are described. A set of instructions that support a store operation under a per-byte predicate mask is provided. The invention accelerates the handling of small transfers at arbitrary alignments, such as those used by xDSL modems to deal with ATM cells or Reed Solomon codewords.

14 Claims, 7 Drawing Sheets

700

|   | 7 | 6 | 5 | 4 | 3 | 2 | 1 | 0 |     |            |
|---|---|---|---|---|---|---|---|---|-----|------------|
|   |   |   |   |   |   |   |   |   |     |            |
|   |   |   |   |   |   |   |   |   |     |            |
| 710 | W | W | W | W | W | W |   |   | +0  | WRITE_BASE |
| 712 | W | W | W | W | W | W | W | W | +8  |            |
| 714 | W | W | W | W | W | W | W | W | +16 |            |
| 716 |   |   |   | W | W | W | W | W | +24 |            |
|   |   |   |   |   |   |   |   |   |     |            |
|   |   |   |   |   |   |   |   |   |     |            |

FIG. 7

SYSTEM AND METHOD FOR PERFORMING MASKED STORE OPERATIONS IN A PROCESSOR

BACKGROUND OF INVENTION

1. Field of the Invention

The present invention relates generally to programmable digital processors and, more particularly, to data storing instructions used in processor systems.

2. Description of the Background Art

Data transfers at arbitrary alignments, or of arbitrary size, are used in the performance of certain software functions. In the area of data communications, such transfers may be encountered, for example, in dealing with sequences of fixed-size cells such as 53-byte ATM cells, with blocks of data forming Reed-Solomon code words that can be of any size between 3 and 255 bytes, or with streams of variable-sized packets, where individual packets may range in size from a few bytes up to a thousand bytes or more.

In a typical programmable digital processor system that includes a memory, the smallest individually accessible unit of data storage in the memory is of a first size (e.g. a byte holding 8 bits), while the primary access mechanism for the memory is able to transfer data into or out of that memory in a single access unit of larger second size (e.g. as a word of 32 bits, or a long-word of 64 bits, etc.). In many such systems, storing data units larger than a byte into memory by the processor can only be accomplished at all, or may only be fully efficient, at certain alignments, dependent on the processor's data addressing scheme.

For example, consider a typical system that includes both a processor and a memory to which it is interfaced. For illustrative purposes (though the principles apply independently of the specific details), the processor chosen is a 64-bit machine. That is, the basic size of data value it manipulates, and holds within an individual register of the processor, is a 64-bit unit, equivalent to eight 8-bit bytes, or one full storage unit of the memory. The memory is constructed as an array of 64-bit wide (long-word) storage units, where each 64-bit unit can be written to in a single store operation. The memory is also accessible to store an individual byte, or a 16-bit half-word, or a 32-bit word, in a single store operation.

In order to allow most common access patterns to be used without undue complication in the logic, the interface between processor and memory in a system of this type typically provides access only using "natural alignment." That is, a byte can be freely stored at any of the eight different byte positions in a given 8-byte long-word storage unit, at offsets {0, 1, 2, ... 7}, while a half-word can be stored only at one of the four even offsets {0, 2, 4, 6} (i.e. half-word aligned), and a word can be written only at either of the two word-aligned offsets {0, 4}, word-aligned.

As an additional consideration, it is typical for a store instruction that stores out a data unit smaller than the full size of the processor's general registers—say, one that stores a half-word (16 bits, two 8-bit bytes) from a 64-bit register—to support the storing of only the least-significant such sub-unit in the source register. This restriction is often imposed in order to either reduce complexity in the processor's memory interface circuitry, or to prevent the number of distinct instructions from becoming overly large, or for both reasons. Considering the latter aspect for the example system, a total of 15 distinct store instructions would be needed to allow all naturally aligned sub-units within a register to be directly stored for all 4 sizes (byte, half-word, word and long-word, respectively at 8, 4, 2 and 1 possible naturally aligned locations in the source register). Even then, that does not allow non-naturally-aligned units within the source register to be stored for the half-word and word-sized cases. In contrast, the restricted case needs only four distinct instructions to support all four sizes of store operation. A programmer can implement any of the other cases by combining instructions (e.g. by using a right-shift instruction followed by a store instruction).

In this type of system, as previously indicated, it is commonly required to be able to store a single byte at any byte location within the memory. Such a store (implemented, for example, by a "store byte" instruction) implicitly refers to whichever full-sized (64-bit) storage location in the memory includes the particular byte location, since the basic access unit is 64 bits in width. However, the store operation must be implemented in such a way as to avoid storing any data to other byte locations in the same long-word storage unit. For that reason, many memory systems are implemented using "byte-enable" signals. A "byte-enable" signal is defined for each byte lane over the full width of the memory (e.g., eight signals for an 8-byte (long-word) wide memory). These signals select for each byte lane whether or not the byte at that part of the selected long-word memory storage location will be overwritten with new data supplied via an access path in the corresponding lane when a store operation is performed. Typically, byte-enable signals are generated within memory access logic of the processor in accordance with the specific details of each store operation performed. One byte-enable signal is transmitted over the access path for each data byte, during the operation of a store instruction of the processor as it writes data into the memory.

In order to accomplish data storage at an arbitrary alignment using such a system (e.g. to store a 4-byte word starting at offset 3), or to store an arbitrary sized unit of up to the basic storage unit size (e.g. a 5-byte section of data to be stored at offsets 2.6), a programmer must develop an algorithm using the available memory store instructions of the processor. One way to do this involves reading data currently stored at a target memory location and merging it with source data to fill in any gaps caused by the arbitrary alignment. The merged data, of the full storage unit size, would then be written to the target memory location. However, such an algorithm may be relatively slow because there may be a delay reading the data from the target location. The algorithm may also be complex and involve several instructions, especially if the size and relative alignment of the storage operation are not fixed in advance. Such an algorithm may also imply certain constraints on the usage of the memory locations in the vicinity of the target memory location to be stored to.

In an alternative approach, the data to be stored at the arbitrary alignment could be broken up into multiple smaller parts, each individually sized and re-aligned to meet the constraints of the interface, and stored separately. However, this type of algorithm is also likely to be relatively complex and slow when compared to the case of a naturally aligned storage operation. A software implementation of such an algorithm is therefore likely to be less convenient, and may be undesirable to use as a general mechanism, because of its higher cost.

Therefore, what is desired is a system and method that significantly reduces the cost and complexity of performing data storage operations at arbitrary alignments, or of arbitrary sizes.

SUMMARY OF INVENTION

The invention includes a method for storing data in a destination memory. The method includes the steps of issuing a masked store instruction to a processor, and processing the masked store instruction in the processor. The step of processing the masked store instruction further includes the step of identifying a data register, a target address and a mask, as well as the step of identifying which bytes of the data in the data register are not masked, and the step of writing the bytes of the data register that are not masked to the destination memory, in accordance with an embodiment of the present invention.

The invention also includes an integrated circuit for processing memory access instructions. The integrated circuit includes a processor, a data register, a predicate register, and a means for the processor to store data to a memory. The memory may be either included in the integrated circuit, or external to it. The processor is configured to store data contained within the data register to the memory. The processor also consults the predicate register to read the mask and stores each of the bytes of data from the data register to the memory only if the mask indicates that the byte of data is to be stored, in accordance with an embodiment of the present invention.

The invention further includes a method for creating a mask, wherein the mask defines which bytes of a sequence of bytes are to be stored. The method includes the steps of issuing a set mask instruction, identifying a mask result location, an offset, and a byte count from the instruction, and determining a data size by subtracting the offset from the byte count. If the data size is less than or equal to zero, the mask is set to all zeros. If the data size is greater than the width of the mask in bits, the mask is set to all ones. If the data size is greater than zero and less than or equal to the width of the mask in bits, a consecutive sequence of the mask's bits corresponding to the data size are set to one, starting from the mask's least significant bit, and the mask's remaining bits are set to zero, to form the mask value which is assigned to the identified mask result location. Each bit value in the mask corresponds to a byte location within a target memory location. A value of zero in the mask indicates that the corresponding byte location will not be stored to, and a value of one in the mask indicates that the corresponding byte location will be stored to, in accordance with an embodiment of the present invention. In an alternative embodiment, the meaning of the values zero and one are exchanged, such that a zero bit indicates that the corresponding byte location should be stored to, and a one bit that it should not be stored to.

The invention additionally includes a second method for creating a mask, wherein the mask defines which bytes of a sequence of bytes are to be stored. The second method includes the steps of issuing a set mask instruction, identifying a mask result location, an offset, and a byte count from the instruction, and determining a data size by subtracting the offset from the byte count. If the data size is less than or equal to zero, the mask is set to all ones. If the data size is greater than the width of the mask in bits, the mask is set to all zeros. If the data size is greater than zero and less than or equal to the width of the mask in bits, a consecutive sequence of the mask's bits corresponding to the data size is set to zero, starting from the mask's least significant bit, and the mask's remaining bits are set to one. Each bit value in the mask corresponds to a byte location within a target memory location. A value of zero in the mask indicates that the corresponding byte location will not be stored to, and a value of one in the mask indicates that the corresponding byte location will be stored to, in accordance with an embodiment of the present invention. In an alternative embodiment, the meaning of the values zero and one in the bits of the mask are exchanged.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

FIG. 7 illustrates an exemplary set of source data and destination data in a memory, according to an embodiment of the present invention.

Figure 1:
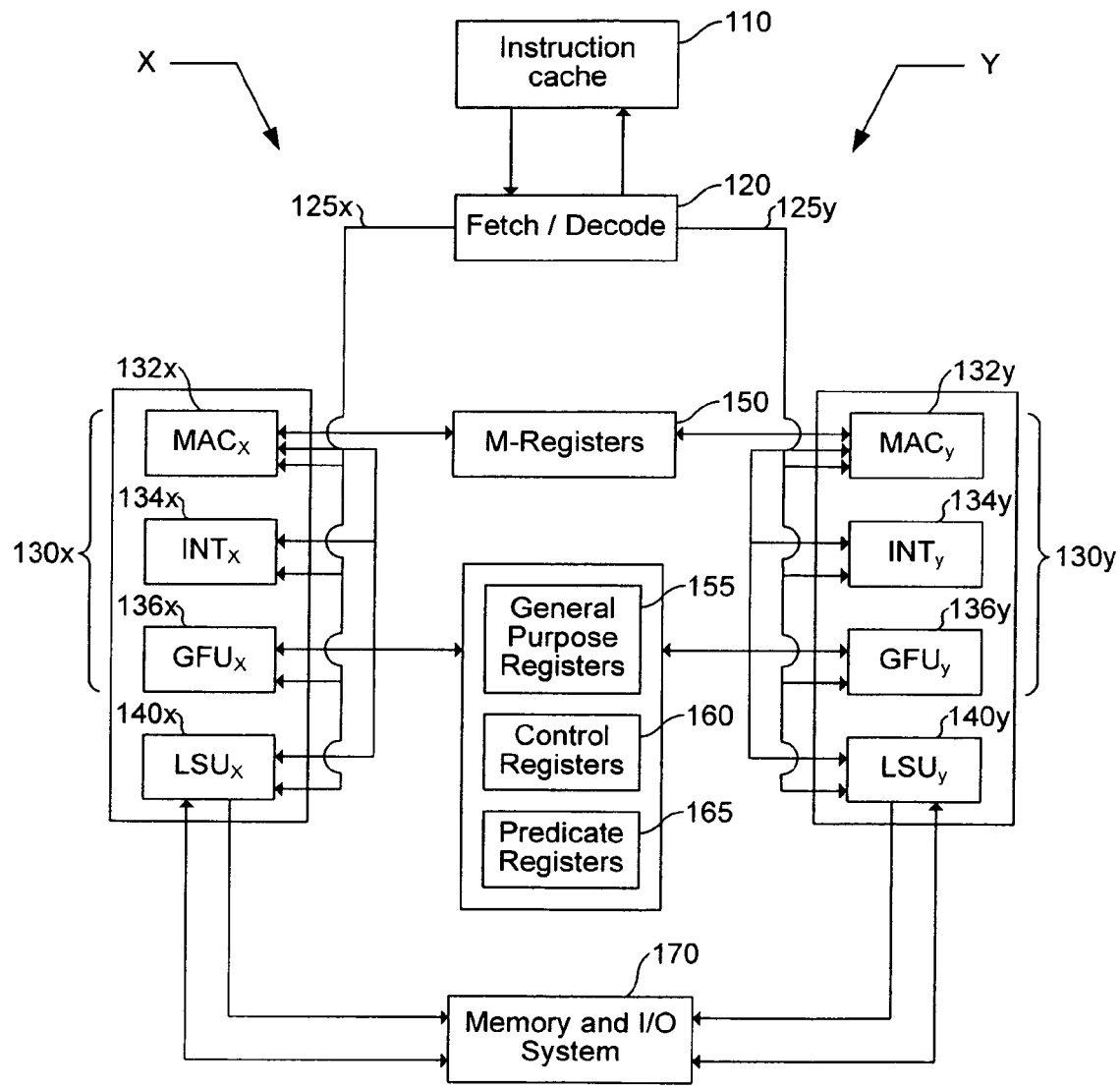
FIG. 1 illustrates an exemplary processor system that may be used to implement the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION

1. Architecture Overview

FIG. 1 illustrates an exemplary processor system 100 for use in the present invention. In an embodiment, the processor system is a 64-bit long instruction word machine including two parallel Single Instruction Multiple Data (SIMD) execution units designated by reference letters X and Y. As would be appreciated by a person skilled in the relevant art, other configurations for processor system 100 can be used with the present invention.

Processor system 100 includes an instruction cache 110 for receiving and holding instructions from a program memory (not shown). The instruction cache 110 is coupled to fetch/decode circuitry 120. The fetch/decode circuitry 120 issues addresses in the program memory from which instructions are to be fetched and receives on each fetch operation a 64-bit instruction from the cache 110 (or from program memory). In addition, the fetch/decode circuitry 120 evaluates an opcode in an instruction and transmits control signals along channels 125$x$, 125$y$ to control the movement of data between designated registers and the Multiplier Accumulator (MAC) 132, Integer Unit (INT) 134, Galois Field Unit (GFU) 136, and Load/Store Unit (LSU) 140 functional units. Other types of functional units (not shown) may also be present within the processor, similarly connected to the fetch/decode circuitry and some or all of the various registers.

Processor system 100 includes two SIMD execution units 130$x$, 130$y$, one on the X-side of the machine and one on the Y-side of the machine. Each of the SIMD execution units 130$x$, 130$y$ includes a Multiplier Accumulator Unit (MAC) 132, an Integer Unit (INT) 134, and a Galois Field Unit (GFU) 136. Multiplier accumulator units 132$x$, 132$y$ perform the process of multiplication and addition of products commonly used in many digital signal processing algorithms. Integer units 134$x$, 134$y$ perform many common operations on integer values used in general computation and signal processing. Galois field units 136x, 136y perform special operations using Galois field arithmetic such as may be executed in implementations of the Reed-Solomon error protection coding scheme.

In addition, a Load/Store Unit (LSU) 140x, 140y is provided on the X and Y-side SIMD units, in accordance with an embodiment of the present invention. Load/Store units 140x, 140y perform accesses to the data memory and I/O system 170, either to load data values from it into a general purpose register 155 or to store values to it from a general purpose register 155. Load/Store units 140x, 140y can also be connected (by means not shown in FIG. 1) to permit data access to and from the instruction memory, or other memories in the processor system 100.

In accordance with an embodiment of the present invention, processor system 100 includes a data cache in order to provide faster access to values in the data memory 170. One skilled in the relevant arts will appreciate that other storage implementations can also be used with the present invention.

Processor system 100 includes a number of Multiply-accumulate registers (M-registers) 150 for holding multiply-accumulate results and multiple general purpose registers 155. In accordance with an embodiment of the present invention, processor system 100 includes four M-registers and sixty-four general purpose registers. In accordance with a further embodiment of the present invention, processor system 100 also includes multiple control registers 160 and multiple predicate registers 165.

2. Masked Store Instructions
2.1 Store Long-Word Under Mask

Figure 2:
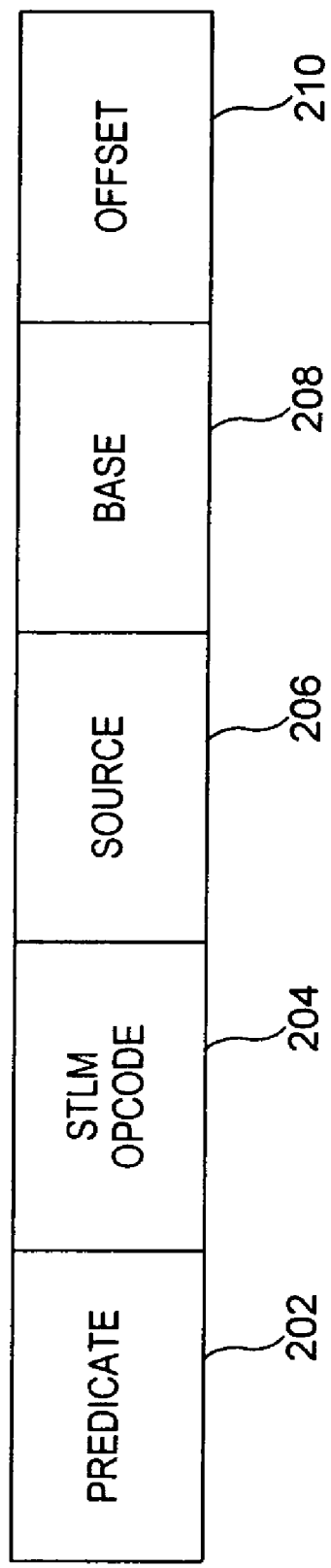
FIG. 2 illustrates an exemplary format for a store long-word under mask instruction, according to an embodiment of the present invention.

FIG. 2 illustrates an exemplary format for a store long-word under mask (STLM) instruction 200, according to an embodiment of the present invention. STLM instruction 200 stores between 0 and 8 bytes of data from a register to a memory location, under control of a predicate register.

STLM instruction 200 includes a predicate operand 202, an opcode 204, a source operand 206, a base operand 208, and an offset operand 210. A target address is computed as the sum of the values of the base operand 208 and the offset operand 210. The target address represents the address in memory at which the store operation is to be performed. One skilled in the relevant arts will appreciate that the operands in STLM instruction 200 need not appear in the order shown in FIG. 2, and may optionally be accompanied by additional operands. Furthermore, one skilled in the relevant arts will also appreciate that the operands may be defined within a software implementation in any manner that allows for the values of the operands as described in STLM instruction 200 to be readily determined.

In accordance with an embodiment of the present invention, the base operand 208 identifies one of the general purpose registers 155, whose contents are read for the base value, and the offset operand 210 is a constant integer represented in some form (for example, as a 2's complement binary number) within that field of the instruction. One skilled in the relevant arts will appreciate that additional ways of representing the target address may be used, for example by scaling the constant integer offset value to allow a larger range of offset values that are multiples of the scaling factor.

In accordance with a further embodiment of the present invention, offset operand 210 does not represent a constant integer but instead identifies a second register from the general purposes registers 155, whose contents are read to provide the offset value. In accordance with an additional embodiment of the present invention, offset operand 210 is ignored or not present in the instruction, and the value of the base operand 208 directly forms the target address.

In accordance with an embodiment of the present invention, for stores to memory spaces that are long-word (64-bit) wide and do not support misaligned store operations, the target address of the STLM instruction 200 should be aligned on a long-word boundary. In a further embodiment, for stores to memory spaces that do support misaligned stores, the target address of the STLM instruction 200 need not be aligned on a long-word boundary. The target address specifies the memory location at which to store data.

The source operand 206 specifies a register, such as one of the general purpose registers 155, from which a long-word of data is obtained. In accordance with an embodiment of the present invention, a long-word is defined as 8 bytes. The predicate 202 identifies a predicate register, such as one of the predicate registers 165, containing one bit per byte to be stored in the operation of STLM instruction 200. In accordance with an embodiment of the present invention, predicate 202 identifies an 8-bit register.

A person skilled in the relevant art will appreciate that the STLM instruction 200 can be extended to similar applications without significant changes. For example, equivalents of the STLM instruction 200 can be used in systems with any word width and any granularity for data addressing.

The following is an exemplary STLM instruction 200 using the format described above in FIG. 2. In the example, 'pM' represents the predicate operand 202, 'STLM' is the symbolic representation for the opcode 204, 'src' represents the source operand 206, 'base' represents the base operand 208, and '#offset' represents a constant offset operand 210, in which 'offset' stands for the particular value of the offset in this instance.

pM.STLM src, [base, #offset]

Figure 3:
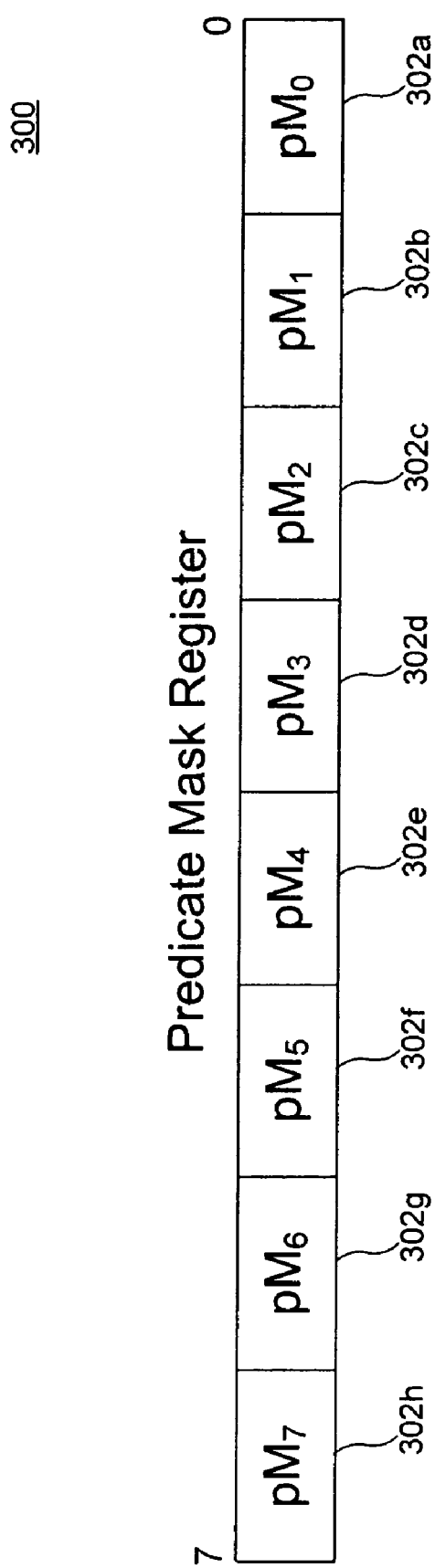
FIG. 3 depicts an exemplary predicate mask register, according to an embodiment of the present invention.

FIG. 3 illustrates a predicate mask register 300, which may be one of the predicate registers 165, which has been identified by predicate operand 202. In accordance with an embodiment of the present invention, predicate mask register 300 includes predicate mask bits $pM_0$-$pM_7$ (302a-302h), one bit corresponding to each byte in the register specified by source operand 206.

Figure 4:
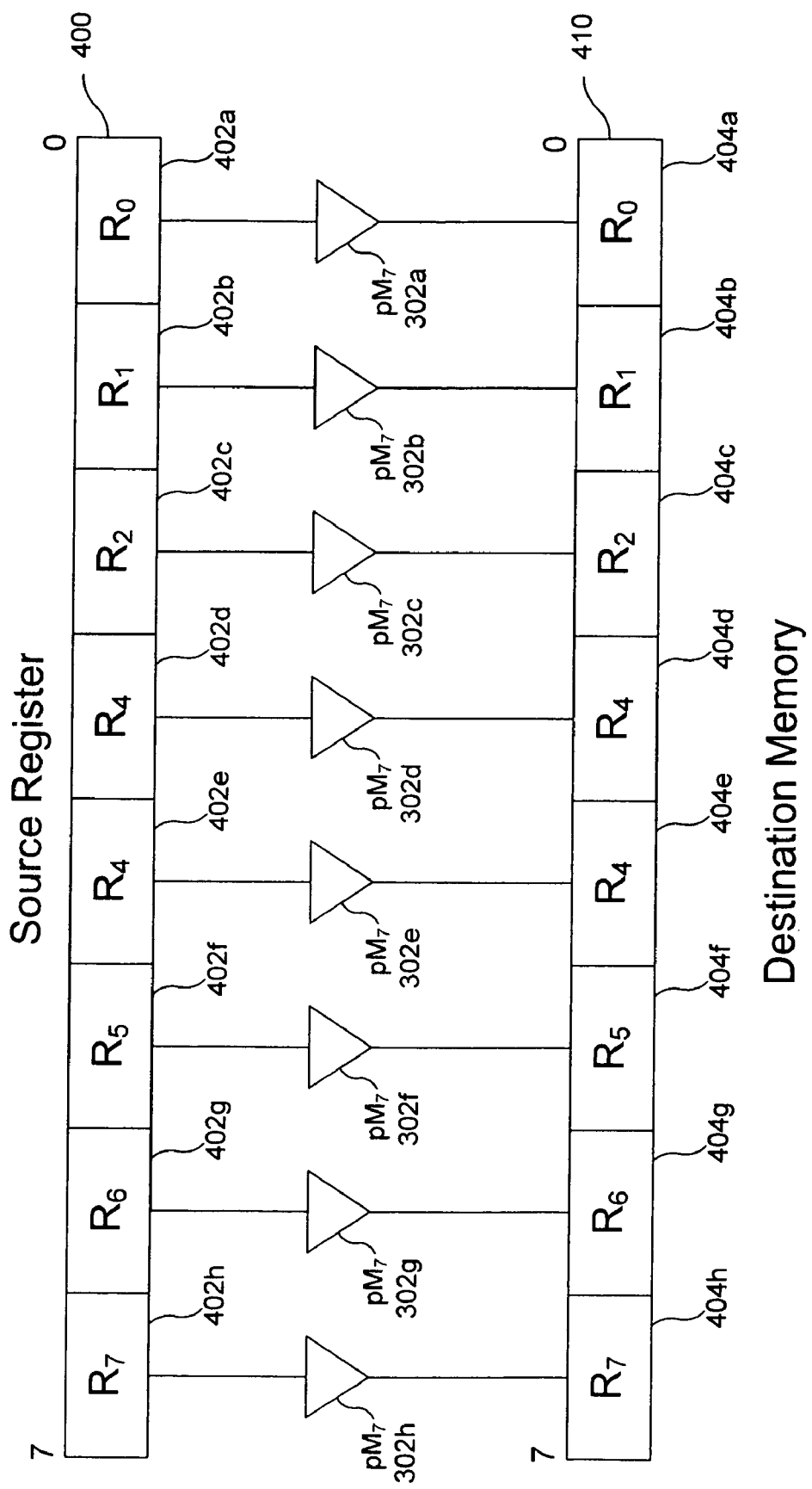
FIG. 4 depicts an exemplary store long-word under mask implementation, according to an embodiment of the present invention.

FIG. 4 illustrates a source register 400 including 8 bytes of data $R_0$-$R_7$ (402a-402h) that are being stored in destination memory 410 at locations $D_0$-$D_7$ (404a-404h) using STLM instruction 200. With predicate register mask 300 applied, mask bits 302a-302h control which bytes from register 400 are stored in destination memory 410. In accordance with an embodiment of the present invention, control is implemented by sending the values of mask control bits 302a-302h as byte-enable signals to a memory system. One skilled in the relevant arts will appreciate that other means may be used to control which bytes from register 400 are stored to destination memory 410.

One skilled in the relevant art will appreciate that the process of storing data using the STLM instruction is independent of the method by which the sequence of data to be stored is obtained. In accordance with an embodiment of the present invention, one such method is performed by loading the sequence of data bytes from a source address in a memory. The combined effect of the loading method and the storing process using one or more instances of an STLM instruction is to copy the sequence of data bytes from the source memory to the destination memory. In course of these steps, the use of STLM allows maximum efficiency in that only the exact byte locations in the destination that will be overwritten by the copied data are actually written to, while all store operations store exactly as many of the data bytes in their respective source registers as are required to be stored in a single operation. Accordingly, the copy operation can be performed using the minimum number of store operations required by the access width of the destination memory, requiring no load operations from the destination memory to be performed.

2.2 Test Count to Set Mask for STLM

Figure 5:
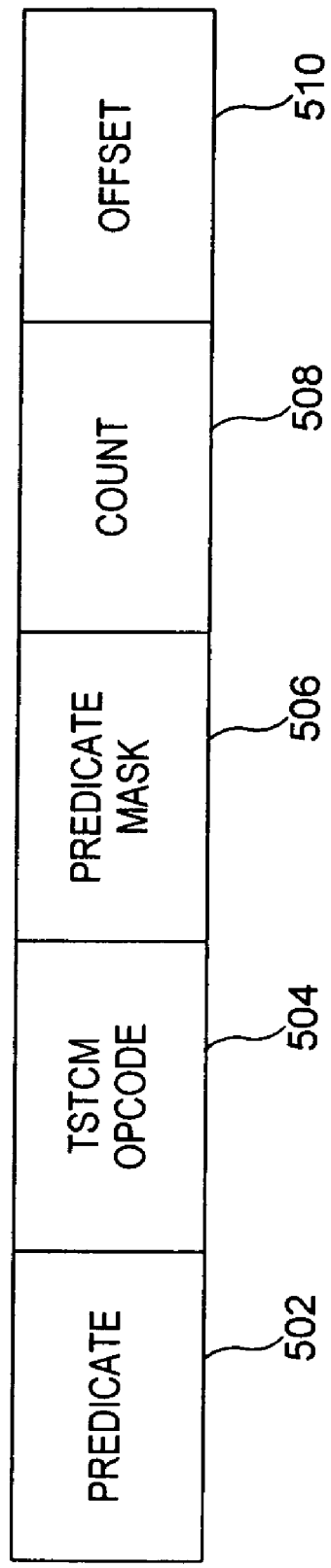
FIG. 5 illustrates an exemplary format for a test count to set mask for store long-word under mask instruction, according to an embodiment of the present invention.

FIG. 5 illustrates an exemplary format for a test count to set mask for STLM (TSTCM) instruction 500, according to an embodiment of the present invention. TSTCM instruction 500 is designed to aid the use of STLM when storing a sequence of bytes, by setting the bits of a predicate mask register, such as predicate mask register 300 from FIG. 3, which can be one of the predicate registers 165 of processor 100 in FIG. 1. For a continuous transfer in which a sequence of consecutive bytes are to be stored, TSTCM instruction 500 determines which bytes, if any, of a source register holding bytes at a certain offset shall be stored. TSTCM instruction 500 includes an opcode 504, a predicate mask operand 506, a count operand 508, and an offset operand 510. Predicate mask operand 506 is used to identify the predicate mask register to which the mask value generated by the TSTCM instruction will be written. The count operand 508 indicates a count of bytes to be written, and typically identifies one of the general purpose registers 155, from which a value of the count will be read. The offset operand 510 defines the value of an address offset, typically represented as a constant integer, in accordance with an embodiment of the present invention. One skilled in the relevant arts will appreciate that the operands in TSTCM instruction 500 need not appear in the order shown in FIG. 5, and may optionally be accompanied by additional operands. Furthermore, one skilled in the relevant arts will also appreciate that the operands may be defined within a software implementation in any manner that allows for the values of the operands as described in TSTCM instruction 500 to be readily determined.

In an exemplary usage of TSTCM instruction 500, a consecutive sequence of data bytes of total length L is stored, in which the length L may not be known until the storing operation is about to be performed (i.e. L is not a constant value). The L bytes are to be stored into a destination memory. Because the length L is in general unknown, the storing operation may be implemented, for convenience, using a software loop to cause repeated execution of a sequence of instructions until all L bytes have been stored. In a generalized function, L=K*M+N, where M is a constant integer greater than zero representing the maximum number of data bytes that can be stored out in one iteration of a loop, and K and N are integers each ≧0, that are calculated once the value of L is known, the storing may be implemented using K iterations of a loop, storing M bytes on each iteration, followed by the execution of a final storing sequence in which N bytes are stored. The storing of the final N bytes could be implemented either as a (K+1)th iteration of the same loop, or as a separate sequence of instructions, according to circumstances. In storing at least the final N bytes, an ordered set of one or more source registers SR0, SR1, etc. is prepared with a total of M data bytes in the sequence, of which N data bytes (N≦M) are to be stored into the destination memory starting at a target address T. An individual source register SRn within the set holds data bytes that are potentially part of the transfer. At least one of the data bytes in SRn will be stored into the destination memory starting at an offset R relative to T if the section of the transfer including the N bytes is of sufficient length, that is, if N>R. For given values of N and the offset R associated with the lowest addressed byte of a source register SRn in the set, TSTCM instruction 500 is used to identify which bytes, if any, in SRn are to be stored at their respective locations in the target memory, starting at address T+R, in accordance with an embodiment of the present invention. In doing so it creates a mask value suitable to be used for predicate operand 202 in an associated STLM instruction that also uses SRn as its source operand 206, thus storing out those identified bytes to the target memory.

In accordance with an embodiment of the present invention, TSTCM instruction 500 further includes an optional predicate 502, wherein the predicate 502 identifies a predicate register, such as one of predicate registers 165, containing one bit per bit of predicate mask register 300. If predicate 502 is specified, the bits of the identified predicate register indicate whether an associated bit of predicate mask register 300 will be set by the TSTCM instruction 500, in accordance with a further embodiment of the present invention.

The following is an exemplary TSTCM instruction using the format described above in FIG. 5.

pC.TSTCM pM, count, #offset

This example of TSTCM instruction 500 has the effect of setting the predicate mask register 300, identified as pM in this example, according to the value of the operand identified as count, the constant value, offset, and the value of the additional predicate pC. The computation is based on, or otherwise equivalent to, the following algorithm, in which size is a local temporary integer value and tm is a local temporary mask value of 8 bits in width:

```
size = count − offset;
if (size <= 0) then tm = 00000000₂;
else if (size > 7) then tm = 11111111₂;
else tm = 11111111₂ >> (8 − size);
pM = (tm & pC) | (pM & (~pC));
```

In the above algorithm, "pM" is the predicate mask register, and the subscript "2" indicates immediately preceding binary numbers. The ">>" operator is a logical (bit-wise) right shift that inserts zeros at the most significant end of its result. The binary "&" operator is bit-wise logical AND, the binary "|" operator is bit-wise logical OR, and the unary "~" operator is logical bitwise complement (inversion). The count and offset are both measured in units of bytes. If, in another instance of TSTCM instruction 500, the optional predicate 502 (pC in the above example) is not explicitly supplied, execution of the algorithm proceeds with pC treated as having the value 11111111₂. The specific application of this algorithm is further discussed below.

2.3 Test Count to Set Inverted Mask for STLM

Figure 6:
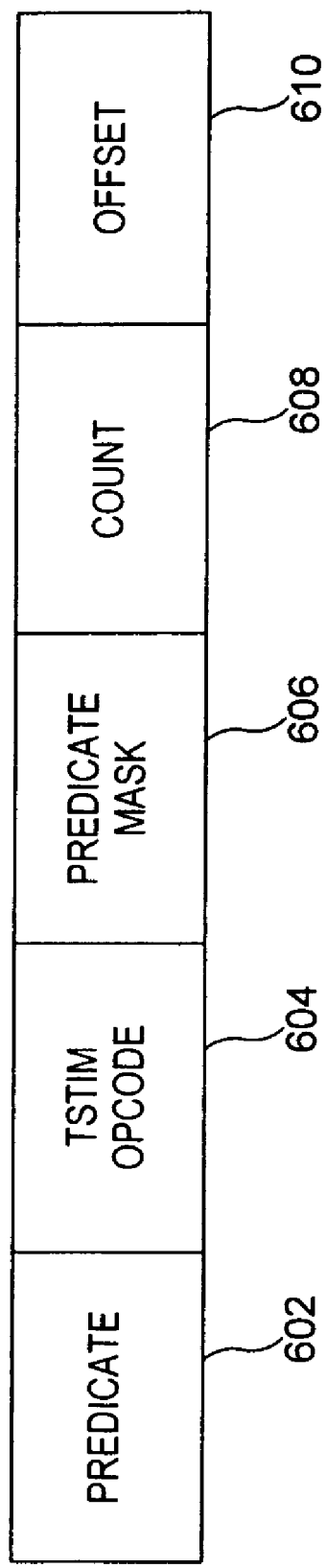
FIG. 6 illustrates an exemplary format for a test inverted count to set mask for store long-word under mask instruction, according to an embodiment of the present invention.

FIG. 6 illustrates an exemplary format for a test count to set inverted mask for STLM (TSTIM) instruction 600, according to an embodiment of the present invention. TSTIM instruction 600 is designed for a similar purpose as TSTCM instruction 500, shown in FIG. 5. However, TSTIM instruction 600 is for the specific circumstance in which there are a number of bytes at the beginning (rather than the end) of a contiguous transfer of a series of bytes that are not to be stored.

TSTIM instruction 600 includes an opcode 604, a predicate mask operand 606, a count operand 608, and an offset operand 610. Predicate mask operand 606 is used to identify a predicate mask register, such as predicate mask register 300 from FIG. 3, to which the mask value resulting from the TSTIM instruction will be written. The count operand 608 indicates how many bytes are being written, and the offset operand 610 indicates the current long word offset, in accordance with an embodiment of the present invention. One skilled in the relevant arts will appreciate that the operands in TSTIM instruction 600 need not appear in the order shown in FIG. 6, and may optionally be accompanied by additional operands. Furthermore, one skilled in the relevant arts will also appreciate that the operands may be defined within a software implementation in any manner that allows for the values of the operands as described in TSTIM instruction 600 to be readily determined.

In accordance with an embodiment of the present invention, TSTIM instruction 600 further includes an optional predicate 602, wherein the predicate 602 identifies a predicate register, such as one of predicate registers 165, containing one bit per bit of predicate mask register 600. If predicate 602 is specified, the bits of the identified predicate register indicate whether an associated bit of predicate mask register 300 will be set by the TSTIM instruction 600, in accordance with a further embodiment of the present invention.

The following is an exemplary TSTIM instruction using the format described above in relation to FIG. 6.

pC.TSTIM pM, count, #offset

The TSTIM instruction 600 has the effect of setting the output predicate mask register 300, identified here as pM, based on the following algorithm, in which size is a local temporary integer value, and tm is a local temporary mask value of 8 bits in width:

```
size = count − offset;
if (size <= 0) then tm = 11111111₂;
else if (size > 7) then tm = 00000000₂;
else tm = 11111111₂ << size;
pM = (tm & pC) | (pM & (~pC));
```

The conventions used earlier to explain the algorithm for TSTCM, including the treatment of optional predicate pC, are also applicable for this algorithm. Additionally, in this algorithm, the "<<" operator is a logical (bit-wise) left shift that inserts zeros at the least significant end of its result. The specific application of this algorithm is further discussed below.

3. Exemplary Application of STLM Instruction

FIG. 7 depicts a section of an 8-byte wide long-word addressed memory 700, in accordance with an embodiment of the present invention. In this example, the memory section shown is included within a buffer to which ATM cells are being written as part of the operation of an ADSL modem. The buffer is being used in a "circular" fashion: as software data processing progresses through the buffer in forward (increasing address) order, after data at the last address in the buffer has been processed, the next data processed will be at the start of the buffer again. The processing takes place repetitively, in two alternating phases. In the first phase, ATM cells (each 53 bytes in length) are produced by some means and stored into the buffer. In the second phase, the cells are read out again. Then the first phase is performed again to write more cell data in, and so on. The cells need not be written in or read out as complete ATM cell units of exactly 53 bytes. For example, the reading phase might treat the buffer as simply a sequence of bytes, an arbitrary number of which (up to the total number available) may be extracted at any particular time. The writing phase therefore must store only as many bytes of data from the cells it is writing in, as there is space for, since the reading phase may stop at any arbitrary point. The writing phase must not overwrite bytes in the buffer that have not yet been read out by the reading phase.

One case of how ATM cells may be produced for writing into the buffer is when no active data cells are available to be processed, and "idle cells" must be generated instead. Idle cells comprise a "header" of 5 bytes with a fixed pattern, followed by 48 "payload" bytes, each of which has the same fixed value. Generating an idle cell is not a computationally intensive process since the values it contains are fixed. The payload bytes all contain the same value; in context of the internal operations of an ADSL modem, this value is hexadecimal 56 (86 decimal). Therefore when the writing process has no active data cells available, it will write (so far as there is space for it to do so) a sequence of bytes comprising the fixed pattern of 5 idle cell header bytes, followed by 48 idle payload bytes each of the value hexadecimal 56, followed by another 5 header bytes, then 48 more idle payload bytes, and so on.

In a further example, the writing phase "catches up" with the reading phase as it writes idle cell data into the buffer. In this example, the 48 bytes of idle cell payload data are in the process of being written. However, during execution of the software function, it is determined that all 48 bytes cannot be written because the buffer is nearly full and there is a gap of only 27 available byte locations between where the first idle cell payload byte would go, and the first byte in the buffer that has not yet been read out by the reading phase and must not be overwritten. Accordingly, the writing phase can write only 27 bytes of idle cell payload bytes into the buffer and must then stop. In FIG. 7, the 27 available byte locations are shown marked with "W". Because the number of bytes read out by the reading phase is not necessarily constant, and since ATM cells are in any case 53 bytes long but 53 is not a multiple of the 8 byte long-word storage unit size, the start and end positions of the 27-byte available space will in general have quite arbitrary alignments. As shown in FIG. 7, the first idle payload byte to be written is at offset 2 in its containing long-word storage unit 710 (i.e. at byte address WRITE_BASE+2) and the last is at offset 4 in its containing long-word storage unit 716 (byte address WRITE_BASE+24+4).

The process of storing idle cell payload byte values into all bytes of the two intervening long-words 712 and 714 may be performed using traditional storage methods, in accordance with an embodiment of the present invention. All byte locations in each storage unit are required to be written, so two conventional "store long-word" instructions, each writing a full 8 bytes of idle cell payload byte value to its respective long-word storage unit, will perform the required function. The data to be stored for each consists of 8 bytes, all of value hexadecimal 56; expressed as a single 64-bit value, this is hexadecimal 5656565656565656.

Of concern is how to handle the short (sub-long-word sized) sections at the beginning and end of the 27-byte sequence to be written out to the relevant section of buffer in the memory 700. The efficiency of these parts of the overall writing phase function can be critical, especially if the writing out operations are mostly of smaller sizes, as in this particular example.

In an additional example, the specific sizes and offsets of these two short sections are known in advance at the time of programming, rather than only when the software function is actually performed. In the absence of STLM instruction 200, storing the six initial idle payload bytes into long-word 712 could be performed using two normal store instructions, a store half-word instruction that writes the 2-byte value hexadecimal value 5656 to the aligned halfword at offset 2 in long-word location 712, and a store word instruction that stores the value hexadecimal 56565656 to the aligned word at offset 4 in the same long-word 712. Similarly, as would be appreciated by one skilled in the relevant art, one store word instruction (writing to the word at offset 0) and one store byte instruction (at byte offset 4) could be used to store the final 5 bytes into long-word 716. A total of four store instructions are needed in this approach, and up to six would be needed, for the case where the initial and final short sections to be written each contain 7 bytes.

STLM instruction 200 can be used to reduce the cost of storing out these short sections, for this exemplary element of software processing in an ADSL modem application. One skilled in the relevant arts will appreciate that STLM instruction 200 can also be used in many other similar applications, and the ADSL modem application is described by way of example and not limitation.

When the initial and final short section sizes are known in advance, two respective mask values can be pre-constructed, one in each of two of the predicate registers 165, identified here respectively as pI (initial) and pF (final), in accordance with an embodiment of the present invention. Depending on the circumstances, these constructed mask values would also be usable over multiple subsequent instances of STLM instruction 200, allowing the cost of their construction to be amortized. The mask value for the initial short section, constructed in first predicate register pI, would be $11111100_2$. The second mask value, in predicate register pF, would be $00011111_2$. One of the 64-bit general purpose registers 155, identified here as rICP, can be prepared to contain the 8-byte replicated idle cell payload value, hexadecimal 5656565656565656. Another general purpose register 155, identified here as rWB, is prepared to contain the base address of the long-word storage unit 710 (i.e., the address WRITE_BASE). To implement the storing of the initial six-byte sequence, a single STLM instruction 200 is executed. To perform the required operation, pI is used as predicate operand 202, rICP as source operand 206, rWB as base register operand 208 and 0 as offset operand 210, as below:

pI.STLM rICP, [rWB, #0]

Accordingly, in a single step, all pertinent byte locations in long-word storage unit 710 are written with the idle cell payload byte value as required, in accordance with an embodiment of the present invention. By contrast, if STLM instruction 200 were not available, two conventional store instructions, and more generally, as many as three conventional store instructions, would be required to achieve the same effect. A second instance of STLM instruction 200 completes the process by storing out the whole 5-byte final short section in a single step, using pF instead of pI as its controlling mask value predicate operand 202, and an appropriate addressing offset:

pF.STLM rICP, [rWB, #24]

3. Exemplary Application of TSTCM Instruction

The above examples of STLM instruction 200 were set forth for the case where the sizes and offsets of any initial and/or final short sections of data (less than one long-word storage unit in size) are known at time of programming, not only at time of code execution. In some applications this condition may hold, and hence the approach as used in the example above will suffice. More generally, however, the sizes and alignments of these short data sections are not known so far in advance. Instead, often only as a particular software function executes does the relevant information become available; this would typically be true in the case of a function such as the writing phase of the processing of ATM cells in a buffer, described above.

TSTCM instruction 500 in FIG. 5 supports the efficient storing of short sections of arbitrary size and alignment into a memory 700. It does so by creating a mask value to enable only the required set of bytes to be stored out by execution of an STLM instruction 200, as when storing to memory an arbitrarily sized and aligned short final (or only) section of a sequence of bytes. Note that although the preceding development of the STLM example assumed this final section was restricted to one storage unit, i.e. of only 0.7 bytes in size, in fact it is also possible to use the TSTCM and STLM instructions in combination to handle an extended section of a store sequence. The framework in relation to that aspect was outlined in above.

In practical use, the STLM and TSTCM instructions are used in combination in circumstances where a certain number (which we will refer to as Count, typically a dynamic variable) of bytes remain to be stored in the sequence. The current value of Count is held in a general purpose register rCount, in accordance with an embodiment of the present invention. In accordance with an additional embodiment of the present invention, the data values possibly to be stored, up to 16 bytes in this example, are held, consecutively, 8 bytes in each of a set of two general purpose registers identified as SR0 and SR1. One skilled in the relevant arts will appreciate that methods by which the values are introduced into registers SR0 and SR1 are readily apparent and, further, that the particular method used does not impact the behavior of the STLM and TSTCM instructions. The address of the current storing position in the sequence (i.e. where the next byte to be written, if any, will be stored) is held in another register rWP, in accordance with a further embodiment of the present invention. To implement the writing out of the required number (Count, or at most 16) of data bytes, the following sequence of instructions can be used:

```
TSTCM    p0, rCount, #0
p0.STLM  SR0, [rWP, #0]
TSTCM    p1, rCount, #8
p1. STLM SR1, [rWP, #8]
```

Note that for increased performance (defined as fewer cycles of instruction execution), in an embodiment of processor system 100, the two sets of TSTCM and STLM operation pairs can be executed in parallel as follows, where on each line the first instruction, before the ":", is executed on the relevant X-side execution unit (e.g. INTx unit 134*x* for the TSTCM instruction and LSUx 140*x* for the following STLM instruction), and the second instruction, after the ":", is simultaneously executed on the appropriate Y-side execution unit, in accordance with an embodiment of the present invention.

```
TSTCM    p0, rCount, #0   :   TSTCM    p1, rCount, #8
p0.STLM  SR0, [rWP, #0]   :   p1. STLM SR1, [rWP, #8]
```

4. Exemplary Application of TSTIM Instruction

TSTIM instruction 600 in FIG. 6 provides a capability, for the specific context of arbitrary alignment of initial data bytes in an initial short section of a storing sequence, to accelerate the storing sequence. In this instance the relative alignment of the first written location in the short section to the preceding long-word aligned location if of immediate importance in using STLM instruction 200, in order to prevent overwriting of any location at a lower address than the first data byte to be stored. For the earlier example (FIG. 7), this offset is 2, for the first (right-most) byte location marked W in long-word location 710 at address WRITE_BASE. In this context there would be computed (by means not shown) a value for that offset, say into a register named rOffset. TSTIM instruction 600, in operation, generates a mask value that ensures that only data bytes for locations at or after this initial location in the target long-word storage unit will be stored to by an STLM instruction 200 using that mask value as its predicate operand 202, and a register, identified below as rWB, containing the base address (WRITE_BASE), in accordance with an embodiment of the present invention. In an example case it could be used in the following manner:

```
TSTIM    p0, rOffset, #0
p0.STLM  rData, [rWP, #0]
```

5. Memory System Design Aspects

Various designs of memory systems provide different levels of support for access to a memory at non-aligned addresses. With respect to write access (store operations), the above examples and explanation of the possible applications of STLM instruction 200 assume the least capable (i.e. most general) model of the relevant class of memory, namely one that, while it supports storing to sub-units down to the level of an individual byte, permits only naturally-aligned store operations. In this most restricted of cases, all of the instructions STLM, TSTCM and TSTIM serve specific beneficial purposes, in respect of increasing the software efficiency of store operations of arbitrary sizes, or at arbitrary alignments.

In another embodiment, using a more capable, but likely more complex, implementation of memory 700 (or the interface to it in processor system 100), the storing of data on un-natural boundaries (such as a half-word at an odd byte offset) is possible. In a yet more capable implementation, in accordance with an additional embodiment of the present invention, it is possible to perform store operations that cross a long-word boundary, such as to store one or more bytes at the highest offset byte location(s) in one long-word storage unit, and as part of the same store operation to store one or more bytes at the lowest offset location(s) in the succeeding (next higher addressed) long-word storage unit. For a memory of this design, the advantages of the combination of TSTIM and STLM are reduced, since it would be possible to commence any storing operation directly at the (arbitrarily aligned) first byte address which was to be written, regardless of its relation to long-word storage unit boundaries. Nonetheless, the use of the combination of TSTCM and STLM instructions would remain advantageous in relation to such a storing operation or sequence of storing operations because the final storing operation can still be of an arbitrary length, and therefore require masking of bytes immediately beyond the last byte to be written. STLM instruction 200, or the combination of TSTCM instruction 500 and STLM instruction 200 together as illustrated above, provide an increase in efficiency of storing operations even when used with a more capable design of memory system. One skilled in the relevant art will appreciate that similar benefits may be derived when the operations disclosed herein are used with further memory systems. The disclosed memory systems are presented by way of example only, and not limitation.

The above description has been presented based on what is commonly termed a "little-endian" mode of memory addressing, wherein the address of a long-word storage unit is defined to be the same as the address of its least significant byte. In another embodiment of the present invention, the same principles are applied to a memory system using the alternative "big-endian" mode, in which the address of a storage long-word is the same as the address of its most significant byte. This can be done by adjustments to the structures and definitions used in the above description that will be readily apparent to one skilled in the relevant arts.

6. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
creating a mask, responsive to a mask creation instruction, for storage in a predicate register based on byte-alignment characteristics of one of more bytes of data in a data register; and
processing a masked store instruction in a processor, comprising storing the one or more bytes of data from the data register to a destination memory only if a corresponding bit in the mask indicates that the byte of data is to be stored.

2. The method of claim 1, further comprising:
configuring a target address for the masked store instruction, wherein processing the masked store instruction comprises writing the one or more bytes of data from the data register to a location corresponding to the target address and the relative position within the data register of a byte of the one or more bytes of data from the data register.

3. The method of claim 1, further comprising:
identifying the predicate register based on a reference in the masked store instruction.

4. The method of claim 1, further comprising:
identifying the location of the data register based on a reference in the masked store instruction.

5. The method of claim 1, wherein creating the mask further comprises consulting a byte-count register configured to store a number of bytes of data to be copied from the data register to the destination memory in a store operation.

6. The method of claim 1, wherein creating the mask further comprises determining which bits of the mask are to be set to indicate bytes of data to be stored by consulting a byte-offset register configured to store a byte-offset corresponding to an address of the destination memory.

7. An integrated circuit comprising:
a data register configured to store one or more bytes of data;
a predicate register, configured to store a mask;
a memory; and
a processor configured to create the mask, responsive to a mask creation instruction, for storage in the predicate register based on byte-alignment characteristics of the one or more bytes of data in the data register and to store the one or more bytes of data from the data register to the memory only if a corresponding bit in the mask indicates that the byte of data is to be stored.

8. The integrated circuit of claim 7, further comprising:
a memory pointer, wherein the memory pointer comprises an address into the memory.

9. The integrated circuit of claim 8, wherein the memory pointer comprises a long-word address into the memory.

10. The integrated circuit of claim 8, further comprising:
an offset pointer, wherein the offset pointer comprises an address into the memory relative to the address in the memory pointer.

11. The integrated circuit of claim 10, wherein the offset pointer comprises a long-word address into the memory.

12. The integrated circuit of claim 7, further comprising:
a byte-count register, wherein the byte-count register is configured to store a number of bytes of data to be copied from the data register to the memory.

13. The integrated circuit of claim 12, wherein the processor is further configured to create the mask by consulting the byte-count register to determine how many bytes of data are to be copied in a store operation.

14. The integrated circuit of claim 7, further comprising:
a byte-offset register, wherein the byte-offset register is configured to store a byte-offset corresponding to an address of the memory, and wherein the processor is further configured to create the mask by consulting the byte-offset register to determine which bits of the mask are to be set to indicate bytes of data to be stored.

* * * * *